United States Patent Office 3,475,266
Patented Oct. 28, 1969

3,475,266
POLYETHER-POLYURETHANE-POLYUREA COMPOSITIONS AND THEIR USES
Albert Pierre Strassel, Colombes, France, assignor to Wyandotte Chemicals Corporation, Wyandotte, Mich., a corporation of France
No Drawing. Filed Oct. 24, 1965, Ser. No. 504,981
Claims priority, application France, Oct. 28, 1964, 992,968
Int. Cl. B32b 27/40; B29d 9/00
U.S. Cl. 161—190
10 Claims

ABSTRACT OF THE DISCLOSURE

The invention provides a polyether-polyurethane-polyurea composition which when utilized as a thin film or coating has excellent mechanical (physical) properties as well as being fluid impermeable and chemically and abrasion resistant. The composition is prepared by reacting a polyether polyol and a polyisocyanate to form a prepolymer which is then reacted with a diamine solution, preferably by spraying the two individual solutions simultaneously onto a supporting surface and allowing the reaction product to cure. The invention additionally provides as an article of manufacture a molded plastic composition having at least part of its surface covered by the above described compound.

---

The present invention relates to new polyether-polyurethane-polyurea compositions intended more particularly to be used for spraying onto a support.

A primary object of the invention is to obtain a polyether-polyurethane-polyurea composition by spraying a mixture of compounds onto a support in order to form thereon a film the thickness of which may range from a few tenths of a millimeter to a few centimeters, and which has good mechanical properties.

Another object of the invention is to provide for the possibility of economically obtaining hard or flexible, compact or cellular articles coated with an adhering film of such a composition, which is capable of making the articles fluid-tight or of protecting the same against abrasion or against chemical or atmospheric agents, and/or providing electrical insulation and improving the appearance of the articles.

Still another object of the invention is to prepare pigmented or colored polyether-polyurethane-polyurea compositions which provide both protective and decorative coatings on various articles and surfaces.

Polyurethane elastomer coatings have already been prepared by spraying, but up to the present time it has been possible to obtain coatings having good properties only with expensive raw materials, namely, prepolymers based on polybutylene glycol and diphenylmethane diisocyanate cross-linked essentially by 3-3′ dichloro-4-4′-diaminodiphenylmethane.

A further object of the invention is to obtain polyurethane-polyurea elastomers having good mechanical properties through direct mixing and reacting by means of a spray gun of two components of considerably lower price than that of the previously used materials.

The composition of the invention is obtained by contacting a polyether-polyurethane prepolymer, previously prepared by reaction of polyether polyols with such a stoichiometric excess of polyisocyanates that the ratio NCO/OH in said prepolymer is from 1.5 to 3 and preferably at least 2, with a diamine dissolved in a volatile solvent, the proportions of the polyether-polyurethane prepolymer and of the diamine contacted therewith being such that the ratio $NH_2/OH$ is greater than 0.5 and preferably between 0.5 and 2 and the ratio $$NCO/OH + NH_2$$

is between about 0.95 and 1.6.

The polyether polyols used for the preparation of the polyether-polyurethane according to the invention may be polyoxyalkylene glycols, such as polyethylene glycol, polypropylene glycol, or the addition products of ethylene or propylene oxides with polyols such as trimethylolpropane, glycerol, hexanetriol, or pentaerythritol.

Mixtures of polyether polyols are advantageously selected which have an average molecular weight between about 400 and 4,000, and preferably between about 400 and 2,000, such mixtures generally leading to improved mechanical properties.

As polyisocyanates use may be made of any aromatic polyisocyanate, preferably ordinary commercial polyisocyanates such as toluene diisocyanate or diphenylmethane diisocyanate.

For the preparation of the prepolymer, there is added to the polyether polyol, or mixture of polyethers-polyols, a quantity of polyisocyanate such that the ratio NCO/OH in the mixture is higher than 1.5, and preferably at least equal to 2. Thereafter, the mixture is heated to a temperature of about 50–150° C. for 1 to 5 hours in an inert gas atmosphere.

The prepolymers thus prepared have a viscosity of the order of 4,000 to 20,000 centipoises at 25° C. As a result of this relatively low viscosity, the prepolymers used according to the invention are sufficiently fluid at temperatures of 50 to 100° C. that they can be used in a spraying operation without the presence of a diluent being necessary.

The diamine may be selected from the diamines such as benzidine, dichlorobenzidine, diaminodichlorodiphenylmethane, methylenedianiline, metaphenylene diamine, dinitrobenzidine, 2-methylpiperazine, hexamethylene diamine, o-tolidine, and the like, or mixture of such diamines. Depending on circumstances, the solvent used for dissolving the diamine may be a ketone, such as, acetone or methylethylketone; a chlorinated hydrocarbon, such as methylene chloride, or dichloroethane; esters, such as methyl, ethyl, methylglycol or ethylglycol acetates; volatile alcohols, such as methylglycol, or solvents such as dimethylsulfoxide, dimethylformamide, dimethylacetamide, propylene carbonate, tetrahydrofurane, and the like, or mixtures of such solvents.

The dissolving of the diamine in the solvent may be effected at ordinary or at elevated temperature with agitation. The solution remains stable. If it is desired to use a minimum quantity of solvent, recrystallization of the diamine is avoided by heating the pots of the spray-device to 50° or 100° C.

In using the compositions of the invention, rapid mixing of the prepolymer and the diamine dissolved in a solvent is advantageously effected by passing the components through a spray gun provided with internal or, preferably, external mixing means, the prepolymer being brought to a temperature of 50–100° C., and directing the spray onto a support which is to be coated. It is also possible to operate with a prepolymer at ordinary temperature after having diluted the prepolymer with the same solvents as those used with the diamine.

The setting of the sprayed mixture begins as soon as it is applied to the support. Because of the reactivity of the constituents, setting takes place without the aid of a catalyst and equally as well on supports at 20° C. as on supports at a temperature which may be as high as 120° C.

A particular feature of the composition of the invention is that it does not require curing. Curing may however be effected between 50 and 120° C. for 15 minutes if, for example, it is desired to withdraw the elastomeric film from a mould on the walls of which the mixture was sprayed. If however, spraying is effected on a large surface or if for any reason it is not possible to heat the support, the coating will acquire excellent mechanical properties after a few hours. All stickiness will disappear, even in the cold after a few minutes.

In a particularly preferred embodiment, the present invention resides in a method for producing a coating or layer of a polyether-polyurethane-polyurea composition on a support, which method comprises the steps of spraying on the support a mixture of at least one polyether-polyurethane prepolymer having an NCO/OH ratio from 2.75 to 3 and a viscosity in the order of 4,000 to 20,000 centipoises at 25° C. with a solution of a diamine in an inert volatile solvent, the diamine containing only nitrogen, hydrogen and carbon atoms, the proportions of prepolymer and diamine in the mixture being such that the mixture has an $NH_2/OH$ ratio higher than 0.5 and an $NCO/OH+NH_2$ ratio between 0.95 and 1.6, and curing the mixture at a temperature in the range of 20 to 50° C. for a period of time ranging from 4 to 20 minutes. In other words, as regards the diamine, it can also be described as one containing no negative substituents such as halogen or nitro groups. Examples of suitable diamines for use in this embodiment of the invention include benzidine, methylene dianiline, metaphenylene diamine, 2-methylpiperazine, hexamethylene diamine, o-tolidin, and mixtures thereof. It has been discovered that the coating composition prepared in this manner has outstanding physical properties and is particularly suitable for spray applications. The composition is especially suitable for use as coatings for moulded plastic or polyurethane foam articles because of the short cure times that are possible at the low cure temperatures.

Pigments or dyestuffs, whether or not pasted with a plasticizer or solvent, may be added preferably to the diamine solution, but in the case where said pigments and dyestuffs are inert and anhydrous they may be mixed with the prepolymer, or else mixed partly with the latter and partly with the diamine solution.

The invention is illustrated by the following, non-limitative examples:

EXAMPLE 1

Preparation of a prepolymer PEI 1250 grams of a polypropylene glycol hereinafter called P1010, having an average molecular weight of 1000, were dehydrated for 1 hour at 120° C. under 3 mm. Hg. The polyol was cooled while still under vacuum. At a temperature of 50° C., 435 grams of toluene diisocyanate (TDI) were then added under a current of nitrogen and with good agitation. The temperature was allowed to rise to 80° C. and maintained for 3 hours at 80° C.±2° C. The mixture was then cooled.

After 48 hours a prepolymer PEI was obtained, which contained 1.48 NCO groups per kilogram, and could be kept in a closed container. The NCO/OH was equal to 2.

EXAMPLE 2

Preparation of a prepolymer PEII

A mixture of 3.213 kilograms of a polypropylene glycol (P2010) having an average molecular weight of 2,000, and 1.287 kilograms of prepropylene glycol (P410) having an average molecular weight of 400, was dehydrated under the same conditions as the polyol in Example 1. 1.566 kilograms of TDI were added under the conditions described in Example 1. The prepolymer PEII thus obtained contained 1.48 NCO groups per kilogram. The NCO/OH was equal to 1.9.

EXAMPLE 3

Preparation of a prepolymer PEIII

A prepolymer PEIII was prepared from a mixture of 5.528 kilograms of P2010 and 472 grams of P410, as defined in Example 2. The dehydrated mixture was brought to a temperature of 80° C.±2° C. 1.920 kilograms of TDI were added with good agitation and while maintaining this temperature. The mixture was then heated at 95° C. for 2 hours.

Prepolymer PEIII contained 1.75 NCO groups per kilogram. The NCO/OH was equal to 2.75.

EXAMPLE 4

At the outlet of an external mixture type spray gun, components A and B described hereinafter were mixed in the proportion of 100/42 under an air pressure of 4.5 kilograms per square centimeter. Component A was the prepolymer PEI prepared in Example 1 and brought to a temperature of 75° C., component B being a mixture of:

| | Grams |
|---|---|
| Methylenedianiline | 28.1 |
| Methylglycol acetate | 52.1 |

The mixture was sprayed onto various supports, viz silicone rubber, a soloconized metal plate, a siliconized polyvinyl chloride sheet, a siliconized polyurethane-polyurea elastomer sheet. Some of the supports had a grained surface (for example to imitate leather), and some were perferctly smooth. Before the cross-linking of the elastomer (1–10 minutes after spraying), a wooden board or metal plate, or a sheet of any foam material, or felt, leather, fabric or other material was applied to the elastomer. After a few minutes at 20° C. (4 to 20 minutes), the elastomer was removed from the support and an article was thus obtained which was coated with a perfectly adhering polyurethane elastomer layer having according to the case the design or graining given by the support.

The mechanical properties of the polyether-polyurethane-polyurea elastomers prepared were as follows:

| | |
|---|---|
| Tensile strength kgs. per sq. cm | 158 |
| Elongation percent | 200 |
| 100% elongation modulus kgs. per sq. cm | 108 |
| Tear resistance kgs. per cm | 82 |

The articles obtained may be used for the manufacture of footwear soles, carpets for automobile industry, decorative boards for walls and the like, floor coverings, and the like.

EXAMPLE 5

Elastomer films from 3/10 to 2 millimeters thick were obtained by spraying onto a rigid or flexible support (e.g. wood, leather, fabric, expanded polyurethane, felt or the like) by means of a 2-component machine and an external mixture type air pressure spray gun, a mixture of a component A (PEI brought to a temperature of 65° C.) and a component B of the following composition:

| | Grams |
|---|---|
| Methylenedianiline | 30 |
| Ethylglycol acetate | 32 |
| Ethyl acetate | 19 |

The ratio A/B being 100/40.

Immediately after spraying, a siliconized mould having a design in relief was applied to the elastomer. After a few minutes the mould was removed and a board or flexible sheet obtained which was coated with a perfectly adhering film of polyurethane elastomer. The elastomer film had a surface design in relief corresponding to that of the mould applied. It was thus possible to produce footwear soles or heels as well as imitation leather or decorative objects.

The mechanical properties of the polyether-polyurethane-polyurea elastomer thus prepared were as follows:

Tensile strength _____ kgs. per sq. cm__ 191
Elongation _____ percent__ 233
100% elongation modulus _____ kgs. per sq. cm__ 130
Tear resistance _____ kgs. per cm__ 110

EXAMPLE 6

A mixture of the prepolymer PEII of Example 2 and of the following solution:

| | Grams |
|---|---|
| Methylenedianiline | 36.2 |
| Methylethylketone | 48.7 | in which the ratio PEII/solution was 100/34, was sprayed as previously described.

Spraying was effected onto a roofing, a floor, a concrete terrace, and on a vertical concrete wall. The adhesion of the elastomer on the support was excellent. The elastomer provided protection against abrasion, weather, and chemical agents a few hours after spraying.

The mechanical properties of the polyether-polyurethane-polyurea elastomer prepared were as follows:

Tensile strength _____ kgs. per sq. cm__ 213
Elongation _____ percent__ 351
100% elongation modulus _____ kgs. per sq. cm__ 105
Tear resistance _____ kgs. per cm__ 107

EXAMPLE 7

100 grams of PEIII brought to a temperature of 95° C. and 8.4 grams of metaphenylenediamine dissolved in 15 grams methylethylketone and 8 grams of ethyl acetate were sprayed by means of an external mixture type spray gun.

The mixture was sprayed onto the inner wall of moulds for an elbow rest and a motor car instrument panel, respectively. The moulds were made of a silicone elastomer or of a silicone coated, flexible polyurethane elastomer. The mould was brought to a temperature of 50° C., the sprayed film was left for 5 minutes at the said temperature whereafter a composition for producing a semi-rigid polyurethane foam was poured onto it. After 10 minutes curing at 50° C., the finished article was removed from the mould. The adhesion of the elastomeric film to the polyurethane foam was perfect. The film had the appearance of leather.

The mechanical properties of the polyether-polyurethane-polyurea elastomer prepared were as follows:

Tensile strength _____ kgs. per sq. cm__ 300
Elongation _____ percent__ 375
100% elongation modulus _____ kgs. per sq. cm__ 120
Tear resistance _____ kgs. per cm__ 139

EXAMPLE 8

This example illustrates different varieties of prepolymers that can be used in practicing the method of this invention.

TABLE I

| Components | Composition of prepolymers, grams | | | | | | | | |
|---|---|---|---|---|---|---|---|---|---|
| | PEIV | PEV | PEVI | PEVII | PEVIII | PEIX | PEX | PEXI | PEXII [9] |
| TP1540 [1] | 500 | | | | | | | | |
| TP2540 [1] | | 2,800 | | | | | | | |
| TMP [2] | | | 137 | | | | | | |
| L61 [3] | | | 3,840 | | | | | | |
| PE2712 [3] | | | | 480 | | | | 500 | 1,072 |
| TPE4542 [4] | | | | | 900 | | | | |
| GP3030 [5] | | | | | | 950 | | | |
| PeP450 [6] | | | | | | | 1,000 | | |
| T701 SCU [7] | | | | | | | | 250 | |
| P410 [8] | | | | | | | | | 178 |
| TDI | 200 | 585 | 1,220 | 60 | 154 | 206 | 2,610 | 170 | 347 |
| MDI | | | | | | | | | 203 |
| NCO/OH | 2.3 | 2 | 2 | 2 | 2.9 | 2.5 | 3 | 3 | 2.75 |
| f NCO/kg | 1.64 | 1 | 1.30 | 1.27 | 1.1 | 1.24 | 5.5 | 1.42 | 1.95 |
| Spraying temperature of prepolymers (used without solvents) °C | 80 | 95 | 95 | 80 | 80 | 80 | 100 | 90 | 85 |

[1] TP1540 and TP2540: Produced by addition of propylene oxide to trimethylolpropane (molecular weights 1,500 and 2,500).
[2] TMP = Trimethylolpropane.
[3] L61 and PE2712 polyoxypropylene and polyoxyethylene glycols (molecular weights 2,000 and 2,700).
[4] TPE4542 = Product of addition of propylene and ethylene oxides to trimethylolpropane (molecular weight 4,500).
[5] GP3030 = Oxypropylated glycerol (molecular weight 3,000).
[6] PeP450 = Oxypropylated pentaerythritol (molecular weight 400).
[7] Tetronic 701SCU = Product of addition of ethylene and propylene oxide to ethylene diamine (molecular weight 3,500).
[8] P410 = Polyoxypropylene glycol (molecular weight 400).
[9] The prepolymer PEXII was obtained by the procedure described in Example 1. However, the MDI was added only after 3 hours heating of the polyols and the TDI at 80° C. A single homogenization followed.

EXAMPLE 9

Additional examples of diamine solutions stable at 20° C. or in the pots of the machine brought up to the desired temperature, are given in Table II. These solutions can be used as indicated in Examples 4 to 7, on condition that there is maintained a $NH_2/OH$ ratio of between 0.5 and 2 and a $NCO/OH+NH_2$ ratio of between 0.95 and 1.6.

TABLE II

| Diamine (10 grams) | Methyl ethyl ketone | Acetone | Ethyl acetate | Dimethyl sulphoxide | Methyl glycol acetate | Methyl glycol | Methylene chloride |
|---|---|---|---|---|---|---|---|
| o-Tolidine, g | | | 14 | | | | |
| 2-4 diaminotoluene, g | | 60 | | | | | |
| 3-3' dinitrobenzidine [1], g | | | 38 | | | | |
| Hexamethylenediamine, g | 15 | | | | | | |
| Benzidine, g | | | | | | 20 | |
| 2-methylpiperazine, g | | | | | | 70 | |
| 3-3' dichlorobenzidine [1], g | | | | 30 | | | |
| 3-3'-dichloro-4-4'-diaminodiphenyl methane [1], g | 40 | | | | | | |
| Diaminodiphenyl methane, g | | | | | 10 | | 80 |
| Methapenylenediamine, g | | | | | | 25 | |

[1] These solutions do not lead to good results when they are used for the applications described in Examples 4, 5, and 7 owing to their comparatively low reticulation speed. They may, however, be advantageously employed for the purposes described in Example 6 where the length of cure time is not a critical factor. In general, the various mixtures of Examples 8 and 9 used under the conditions as described in the other examples lead to comparable results.

What is claimed is:

1. A method for producing a polyether-polyurethane-polyurea composition which comprises intimately mixing at least one polyether-polyurethane prepolymer having a NCO/OH ratio from 1.5 to 3 and a viscosity in the range of 4,000 to 20,000 centipoises at 25° C. with a solution of at least one diamine in an inert volatile solvent, the proportions of prepolymer and diamine in said mixture being such that the resulting mixture has a $NH_2/OH$ ratio greater than 0.5 and a $NCO/OH+NH_2$ ratio between about 0.95 and 1.6.

2. A method according to claim 1 in which said prepolymer and said solution of at least one diamine are mixed at a temperature in the range of about 50 to 100° C.; said resulting mixture is sprayed onto a support; and said mixture is thereafter allowed to cure.

3. A method according to claim 2 in which said prepolymer is prepared by reacting at least one polyether polyol with at least one aromatic polyisocyanate and said diamine is selected from the group consisting of benzidine, dichlorobenzidine, methylene dianiline, metaphenylene diamine, diamino dichlorodiphenylmethane, dinitrobenzidine, 2-methyl-piperazine, hexamethylene diamine, o-tolidin, and mixtures thereof.

4. A method according to claim 1 in which said prepolymer and said solution of at least one diamine are mixed at a temperature in the range of about 50 to 100° C.; said resulting mixture is sprayed onto an anti-adhesion coated surface, thereby forming a non-adhering layer on said surface; a support is applied to said layer; said layer is allowed to cure while adhering to said support; and said layer adhering to said support is removed from said anti-adhesion coated support.

5. A method according to claim 1 in which said prepolymer and said solution of at least one diamine are mixed at a temperature in the range of about 50 to 100° C.; said resulting mixture is sprayed into an anti-adhesion coated mould; said mixture is allowed to cure, thereby forming a non-adhering layer in said mould; said mould is thereafter filled with a mouldable plastic composition, said plastic composition is allowed to cure while adhering to said layer; and said cured plastic composition with said layer adhering thereto is removed from said mould.

6. A method according to claim 5 in which said mouldable plastic composition is a foamable polyurethane composition.

7. A method for producing a layer of a polyether-polyurethane-polyurea composition on a support, which comprises the steps of spraying on said support a mixture of at least one polyether-polyurethane prepolymer having an NCO/OH ratio from 2.75 to 3 and a viscosity in the range of 4,000 to 20,000 centipoises at 25° C. with a solution of a diamine in an inert volatile solvent, said diamine containing only nitrogen, hydrogen and carbon atoms, the proportions of prepolymer and diamine in said mixture being such that said mixture has an $NH_2/OH$ ratio greater than 0.5 and an $NCO/OH+NH_2$ ratio between 0.95 and 1.6; and curing said mixture at a temperature in the range of 20 to 50° C. for a period of time ranging from 4 to 20 minutes.

8. A method according to claim 7 in which said prepolymer is prepared by reacting at least one polyether polyol with at least one aromatic polyisocyanate and said diamine is selected from the group consisting of benzidine, methylene dianiline, metaphenylene diamine, 2-methylpiperazine, hexamethylene diamine, o-tolidine, and mixtures thereof.

9. An article of manufacture comprising a moulded plastic composition having at least a part of its surface coated with a layer of a polyether-polyurethane-polyurea composition having a $NH_2/OH$ ratio of greater than 0.5 and a $NCO/OH+NH_2$ ratio between about 0.95 and 1.6.

10. An article of manufacture according to claim 9 in which said moulded plastic composition is a moulded polyurethane foam.

References Cited
UNITED STATES PATENTS

| | | | |
|---|---|---|---|
| 2,907,719 | 10/1959 | Greenlee | 260—2.5 |
| 2,955,058 | 10/1960 | Foster | 117—104 |
| 3,194,793 | 7/1965 | Kogon | 260—77.5 |

EARL M. BERGERT, Primary Examiner

M. L. KATZ, Assistant Examiner

U.S. Cl. X.R.

117—104, 161; 156—247; 260—2.5, 77.5; 264—255, 260